United States Patent
Pallot et al.

(10) Patent No.: US 11,697,310 B2
(45) Date of Patent: Jul. 11, 2023

(54) TIRE COMPRISING A TREAD CONTAINING REINFORCING ELEMENTS

(71) Applicant: COMPAGNIE GENERALE DES ETABLISSEMENTS MICHELIN, Clermont-Ferrand (FR)

(72) Inventors: Patrick Pallot, Clermont-Ferrand (FR); Frédéric Perrin, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 351 days.

(21) Appl. No.: 16/469,298

(22) PCT Filed: Dec. 7, 2017

(86) PCT No.: PCT/FR2017/053425
§ 371 (c)(1),
(2) Date: Jun. 13, 2019

(87) PCT Pub. No.: WO2018/109324
PCT Pub. Date: Jun. 21, 2018

(65) Prior Publication Data
US 2019/0351708 A1    Nov. 21, 2019

(30) Foreign Application Priority Data

Dec. 13, 2016  (FR) ..................... 1662382

(51) Int. Cl.
*B60C 11/00* (2006.01)
*B60C 11/03* (2006.01)

(52) U.S. Cl.
CPC ...... *B60C 11/0008* (2013.01); *B60C 11/0075* (2013.01); *B60C 11/0304* (2013.01); *B60C 2011/0025* (2013.01)

(58) Field of Classification Search
CPC ... B60C 11/0075; B60C 11/005; B60C 11/18; B60C 11/0041; B60C 11/0008;
(Continued)

(56) References Cited

U.S. PATENT DOCUMENTS 6,336,486 B1    1/2002  Iwasaki et al.
7,188,651 B2    3/2007  Suzuki
(Continued)

FOREIGN PATENT DOCUMENTS

EP    0869016 A2    10/1998
EP    1 508 457 A1    2/2005
(Continued)

OTHER PUBLICATIONS

Co-pending U.S. Appl. No. 16/485,998, filed Feb. 14, 2018 (available on USPTO system).
(Continued)

*Primary Examiner* — Katelyn W Smith
*Assistant Examiner* — Philip N Schwartz
(74) *Attorney, Agent, or Firm* — Venable LLP

(57) ABSTRACT

A tire (1) in which at least one of the said tread pattern blocks (51) comprises a circumferential reinforcing element (52) positioned axially on the inside relative to the said at least one groove (71) when working from the outside towards the inside and axially close to the said circumferential groove, the circumferential reinforcing element (52) is made of a rubber compound having a dynamic shear modulus G* at least twice as high as the dynamic shear modulus G* of the rubber compound of the rest of the blocks of the tread, the circumferential reinforcing element (52) extends radially from the radially exterior surface of the said crown reinforcement (6) towards the surface of the said tread with an axial width which decreases progressively with increasing radial proximity to the outside, and in which the said
(Continued)

circumferential reinforcing element (52) partially forms the axially internal lateral face (7i) of the said at least one of the said tread pattern blocks (51).

9 Claims, 9 Drawing Sheets

(58) Field of Classification Search
CPC ......... B60C 11/0304; B60C 2011/0016; B60C 2011/0033; B60C 2011/0025
See application file for complete search history.

(56) References Cited

U.S. PATENT DOCUMENTS

| | | | |
|---|---|---|---|
| 7,334,618 B2 | 2/2008 | Suzuki | |
| 8,104,523 B2 | 1/2012 | Losi et al. | |
| 8,877,839 B2 | 11/2014 | Veyland et al. | |
| 9,027,615 B2 | 5/2015 | Dermience et al. | |
| 9,623,707 B2 | 4/2017 | Schweitzer et al. | |
| 9,987,884 B2 | 6/2018 | Guerinon et al. | |
| 10,279,629 B2 | 5/2019 | Hashimoto et al. | |
| 2002/0174924 A1 | 11/2002 | Zanzig et al. | |
| 2005/0039834 A1 | 2/2005 | Suzuki | |
| 2005/0045258 A1 | 3/2005 | Suzuki | |
| 2007/0187013 A1* | 8/2007 | Losi | B60C 11/18 156/111 |
| 2008/0105353 A1* | 5/2008 | Losi | B60C 1/0016 152/526 |
| 2012/0283360 A1 | 11/2012 | Veyland et al. | |
| 2012/0318424 A1 | 12/2012 | Lopitaux et al. | |
| 2014/0001454 A1 | 1/2014 | Miyanami et al. | |
| 2014/0069561 A1* | 3/2014 | Dermience | B60C 11/0058 152/209.18 |
| 2015/0107735 A1 | 4/2015 | Djelloul-Mazouz et al. | |
| 2015/0239296 A1* | 8/2015 | Fukuda | B60C 11/0041 152/209.5 |
| 2015/0283854 A1* | 10/2015 | Saintigny | C08L 9/06 524/313 |
| 2015/0328931 A1 | 11/2015 | Guerinon et al. | |
| 2016/0167440 A1* | 6/2016 | Schweitzer | B60C 11/0075 152/209.5 |
| 2017/0050469 A1 | 2/2017 | Hashimoto et al. | |
| 2018/0117972 A1* | 5/2018 | Perrin | B60C 11/0058 |
| 2018/0186189 A1 | 7/2018 | Pallot et al. | |
| 2018/0304693 A1 | 10/2018 | Pallot et al. | |
| 2019/0232720 A1 | 8/2019 | Prost et al. | |
| 2019/0255887 A1 | 8/2019 | Perrin et al. | |
| 2019/0308455 A1 | 10/2019 | Perrin | |
| 2020/0108666 A1 | 4/2020 | Pallot et al. | |

FOREIGN PATENT DOCUMENTS

| | | | | |
|---|---|---|---|---|
| EP | 1512554 A1 | | 3/2005 | |
| EP | 2708382 A1 | | 3/2014 | |
| EP | 3031627 A1 | | 6/2016 | |
| FR | 2954333 A1 | | 6/2011 | |
| FR | 3 035 616 A1 | | 11/2016 | |
| JP | 04-252707 A | | 9/1992 | |
| JP | 8-34205 A | | 2/1996 | |
| JP | 2010-215115 A | | 9/2010 | |
| JP | 2011-183994 A | | 9/2011 | |
| JP | 2014-11392 A | | 1/2014 | |
| JP | 2015107776 A | * | 6/2015 | ............. B60C 11/00 |
| WO | 2005/063509 A1 | | 7/2005 | |
| WO | 2011/045342 A1 | | 4/2011 | |
| WO | 2014/090845 A1 | | 6/2014 | |
| WO | 2015/170615 A1 | | 11/2015 | |
| WO | 2016/174100 A1 | | 11/2016 | |
| WO | WO-2016174100 A1 | * | 11/2016 | ........... B60C 1/0016 |
| WO | WO-2016202703 A1 | * | 12/2016 | ............... B60C 9/18 |

OTHER PUBLICATIONS

International Search Report dated Mar. 2, 2018, in corresponding PCT/FR2017/053425 (4 pages).

* cited by examiner

TIRE COMPRISING A TREAD CONTAINING REINFORCING ELEMENTS

FIELD OF THE INVENTION

The present invention relates to tyres, and more particularly to a tyre, the grip performance of which is improved.

In general, a tyre is an object with a geometry exhibiting symmetry of revolution about an axis of rotation. A tyre comprises two beads intended to be mounted on a rim; it also comprises two sidewalls connected to the beads, a crown comprising a tread intended to come into contact with the ground, the crown having a first side connected to the radially outer end of one of the two sidewalls and having a second side connected to the radially outer end of the other of the two sidewalls.

The makeup of the tyre is usually described by a representation of its constituent components in a meridian plane, that is to say a plane containing the axis of rotation of the tyre. The radial, axial and circumferential directions denote the directions perpendicular to the axis of rotation of the tyre, parallel to the axis of rotation of the tyre and perpendicular to any meridian plane, respectively. In the following text, the expressions "radially", "axially" and "circumferentially" mean "in a radial direction", "in the axial direction" and "in a circumferential direction" of the tyre, respectively. The expressions "radially on the inside" or, respectively, "radially on the outside" mean "closer to" or, respectively, "further away from the axis of rotation of the tyre, in a radial direction". The equatorial plane is a plane perpendicular to the axis of revolution of the tyre, positioned axially in such a way as to intersect the surface of the tread substantially mid-way between the beads. The expressions "axially on the inside" or, respectively, "axially on the outside" mean "closer to" or, respectively, "further away from the equatorial plane of the tyre, in the axial direction".

PRIOR ART

As is known, the tread of a tyre is provided with a tread pattern comprising, notably, tread pattern blocks delimited by various main, longitudinal or circumferential, axial or else oblique grooves, the elementary blocks also being able to have various finer slits or sipes. The grooves form channels that are intended to drain off water when running on wet ground; the walls of these grooves also define the edges of the tread pattern blocks; depending on the orientation of the forces to which a running tyre is subjected, reference is made to a leading edge of a tread pattern block when the force is oriented towards the centre of the block, the trailing edge of a tread pattern block being the opposite edge.

In order to improve the grip of a tyre, and more particularly for grip on dry and wet ground, it is well known to reduce the stiffness or the hardness of the rubber compound forming the tread. This reduction in tread stiffness allows the tread to better match the rough surface of the ground it is running on and thus the actual area of contact with the ground it is running on is increased and the grip performance improved with respect to a tread of which the rubber compound is stiffer.

However, the use of a less stiff rubber tread compound promotes shearing of the tread blocks when the tyre needs to oppose an axially oriented force, and this causes the tread blocks to rock; that generates greatly raised pressures on the leading edges of the tread blocks: these greatly raised pressures in their turn generate very significant heating.

These raised pressures and this heating can contribute towards very rapid damage to the tread of the tyre and to non-optimal exploitation of the grip potential of the tread compound.

Document EP0869016A2 discloses a tyre with a tread comprising two superimposed rubber compounds, in which the interior and exterior compounds have different characteristics, in order to maintain good grip of the tyre after the tread has become partially worn and this interior compound has been revealed at the surface. However, a significant increase in the rolling resistance of such a tyre is observed in comparison with a tyre which, in its tread, uses only the low-stiffness compound, with all other factors being equal.

In order to improve the grip performance of the tyres by stabilizing the tread blocks, document EP 2 708 382 A1 proposes a tyre, the tread of which comprises a circumferential reinforcement made of a rubber compound of a stiffness higher than the stiffness of the compound of the rest of the tread.

This tyre is such that the circumferential reinforcement has a reinforcing element that is positioned under each circumferential groove and extends radially from the radially interior surface of the tread until it forms the entire bottom of the groove.

The reinforcement of the circumferential grooves that is thus produced makes it possible to increase the cornering stiffness of the tyre, but the presence of a stiff compound in the groove bottom makes it difficult to mould the wear indicators. A significant increase in the rolling resistance associated in particular with the limiting of the transverse and longitudinal flattening of the tread in the axial direction and in the longitudinal direction is also observed. A loss of transverse grip, caused by the presence of stiff material on the leading edge corners of the blocks in transverse use is also observed.

Documents JP2014/11392 A and US2015/107735 also present tyres with treads comprising two different rubber compounds.

None of these teachings makes it possible, for the tread, to use high-grip rubber compounds without leading to rapid wearing when the tyre is heavily loaded.

BRIEF DESCRIPTION OF THE INVENTION

One subject of the invention is a tyre having an exterior side and an interior side, comprising a crown reinforcement and a tread radially on the outside, the tread comprising a plurality of tread pattern blocks, two tread blocks being separated by at least one groove extending at least partially circumferentially, and a contact face intended to come into contact with the roadway when the tyre is being driven on, each circumferential groove each being delimited by an axially internal lateral face, by an axially external lateral face and by a groove bottom, the tread having a contact face intended to come into contact with the roadway when the tyre is being driven on and a wear limit level situated radially on the outside of the said groove bottom, characterized in that at least one of the said tread pattern blocks comprises a circumferential reinforcing element positioned axially on the inside relative to the said at least one groove when working from the outside towards the inside and axially close to the said circumferential groove, in that the circumferential reinforcing element is made of a rubber compound having a dynamic shear modulus G* at least twice as high as the dynamic shear modulus G* of the rubber compound of the rest of the blocks of the tread, in that the circumferential reinforcing element extends radially from the radially exterior surface of the said crown reinforcement towards the surface of the said tread with an axial width which decreases progressively with increasing radial proximity to the outside, the said axial width having a maximum value less than 40% of the axial width of the said block, the said circumferential reinforcing element extending radially at most over a height "h" corresponding to 75% of the thickness "p" of the tread, and in that the said circumferential reinforcing element partially forms the axially internal lateral face of the said at least one of the said tread pattern blocks.

The circumferential reinforcing element(s) thus positioned make it possible to compensate for the lower contribution to shear strength and therefore to cornering stiffness of the tyre resulting from the rubber compound used for the rest of the tread; that then makes it possible to maintain a good steering capability for the tyre even when a high-grip soft type of compound is selected for the tread. Unlike in patent EP 2 708 382 A1, the act of having moved the reinforcer away from the leading edge of the block in transverse use makes it possible not to impair the transverse grip while at the same time benefiting from reinforcement in terms of axial shear, making it possible to improve the cornering stiffness of the tyre and therefore the roadholding of the vehicle. The presence of a reinforcing element for a single rib of tread pattern already makes it possible to obtain a significant improvement in the roadholding and axial grip performance of vehicle tyres.

The circumferential reinforcing element may be laid directly on the crown reinforcement of the tyre or laid on a layer or on a thickness of 1 mm to 2 mm of the main material of which the tread is made.

It should also be noted that the invention ensures excellent stiffening by using a relatively small volume of high-stiffness rubber, representing of the order of 5% to 10% of the total volume of rubber in the tread, this leading to a significant advantage in terms of grip, in terms of wear, in terms of the rolling resistance of the tyre, as compared with the tyres disclosed in the aforementioned document EP 2 708 382 A1.

For preference, the circumferential reinforcement comprises two reinforcing elements respectively positioned in the adjacent tread blocks, and preferably in all the blocks. That enhances the favourable effect in terms of axial grip and cornering stiffness of the tyre without leading to loss of transverse grip.

According to one advantageous embodiment, the circumferential reinforcing elements are positioned asymmetrically with respect to the equatorial plane EP of the tyre.

According to one particular exemplary embodiment, the tread having a circumferential groove through which the equatorial plane passes, a circumferential reinforcing element is arranged axially against the internal face of the circumferential groove through which the equatorial plane EP passes. This element is not in contact with the leading edge corner of the block in transverse use. The circumferential reinforcing element extends radially from the radially exterior surface of the crown reinforcement towards the surface of the tread with an axial width which decreases progressively with increasing radial proximity to the outside, the said circumferential reinforcing element extending radially at most over a height corresponding to 75% of the thickness of the tread. The part of the reinforcing element that is furthest towards the outside of the tyre therefore never comes into contact with the external surface of the tyre (surface in contact with the road).

The shape of the circumferential reinforcing element has a cross section that tapers radially towards the outside. This enhances its effectiveness as a bearing point. The walls of this circumferential reinforcing element may be concave, convex or in the form of a staircase.

For preference, the angle α formed by the two lateral walls of the circumferential reinforcing element(s) is between 35 and 45 degrees. Below 35 degrees, the effectiveness of the bearing point is reduced, and beyond 45 degrees, the volume of the circumferential reinforcing element becomes too great.

Advantageously, the rubber compound of which the circumferential reinforcement is made has a dynamic shear modulus G*, measured at 60° C. at 10 Hz and under an alternating shear stress of 0.7 MPa, that is twice as stiff as the rubber material of the tread predominantly in contact with the ground.

Highly advantageously, the rubber compound of the tread has a dynamic shear modulus G*, measured at 60° C. at 10 Hz and under an alternating shear stress of 0.7 MPa, of less than or equal to 1.3 MPa and preferably less than 1.1 MPa. The presence of the circumferential reinforcement makes it possible to make full use of the grip capabilities of such a very low stiffness tread compound. This is particularly useful in the case of a tyre for a passenger vehicle.

According to another advantageous embodiment, the tread comprises two different compounds arranged axially one on top of the other. The compound arranged radially on the inside is usually referred to as a "sublayer". This sublayer may have more favourable hysteresis properties than the compound in contact with the road surface, thus improving the overall rolling resistance property of the tyre. Alternatively, the sublayer may also be stiffer than the rubber compound of the tread in order to stiffen same. The reinforcing element may then rest on the external surface of this sublayer, while maintaining the advantage, in terms of a tyre operation, of bearing directly or almost directly on the crown reinforcement of the tyre.

The invention relates more particularly to tyres intended to equip motor vehicles of the passenger vehicle or SUV ("Sports Utility Vehicles") type, two-wheeled vehicles (especially motorcycles), aircraft, such as industrial vehicles chosen from vans, "heavy-duty vehicles", that is to say, underground trains, buses, heavy road transport vehicles (lorries, tractors, trailers) or off-road vehicles, such as heavy agricultural or construction plant vehicles, and other transportation or handling vehicles.

DESCRIPTION OF THE FIGURES

The objects of the invention will now be described with the aid of the appended drawing, in which.

DETAILED DESCRIPTION OF THE INVENTION

Figure 1:
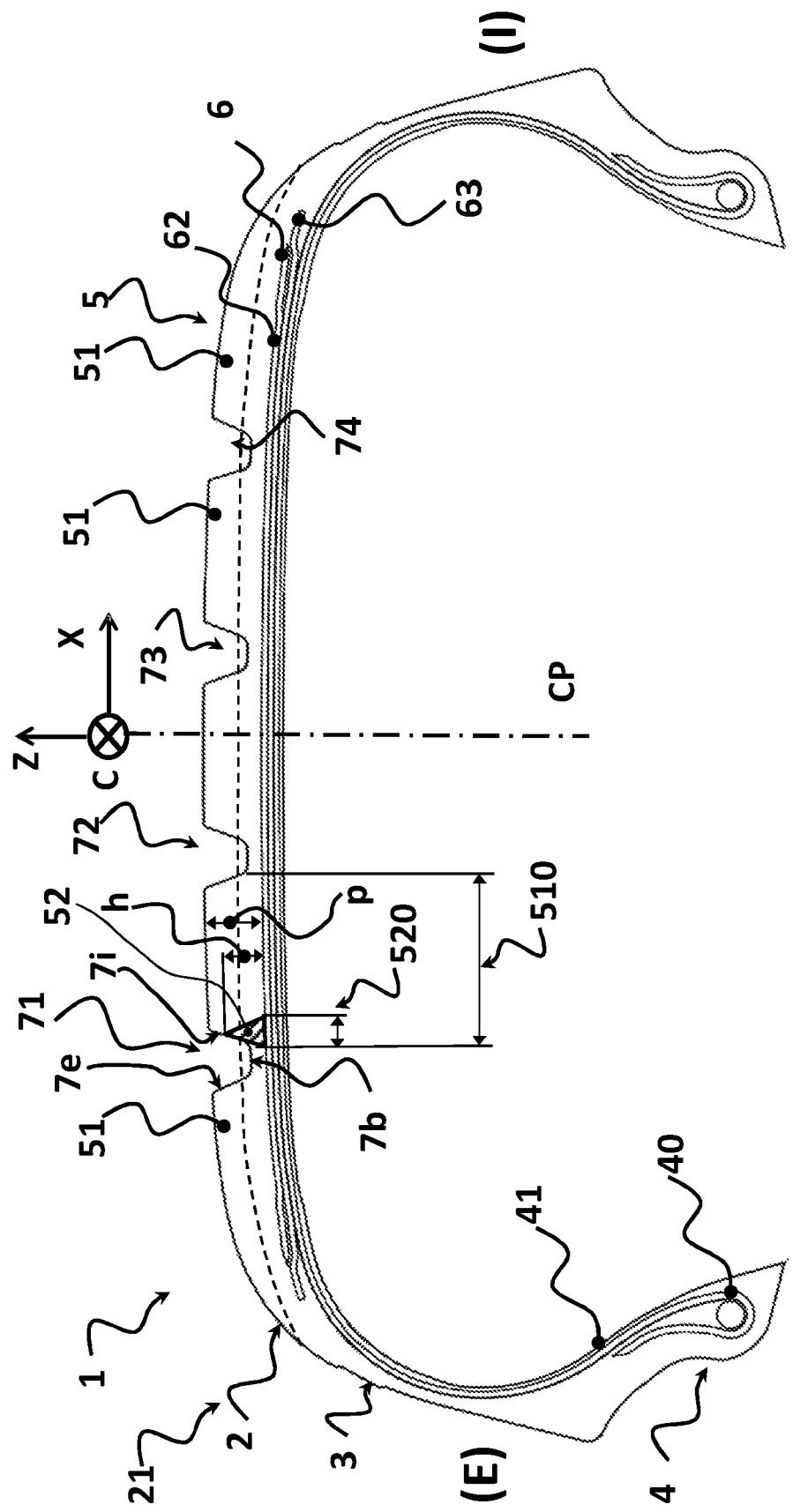
FIG. 1 depicts, highly schematically (without being true to a specific scale), a meridional section through a tyre in accordance with one embodiment of the invention.
Figure 2:
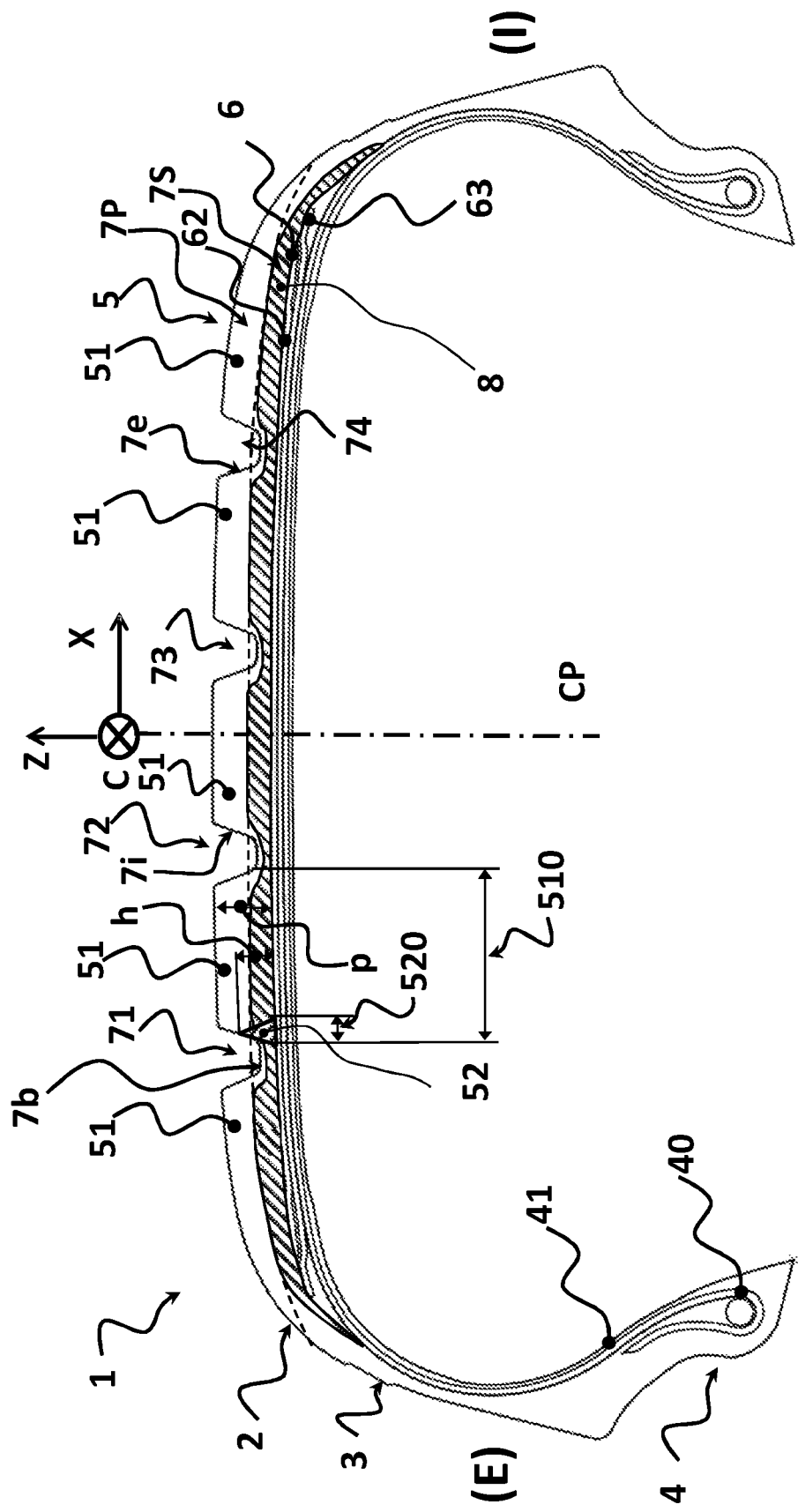
FIGS. 2 to 8 depict, in meridional section, tyres according to different embodiments of the invention.
Figure 3:
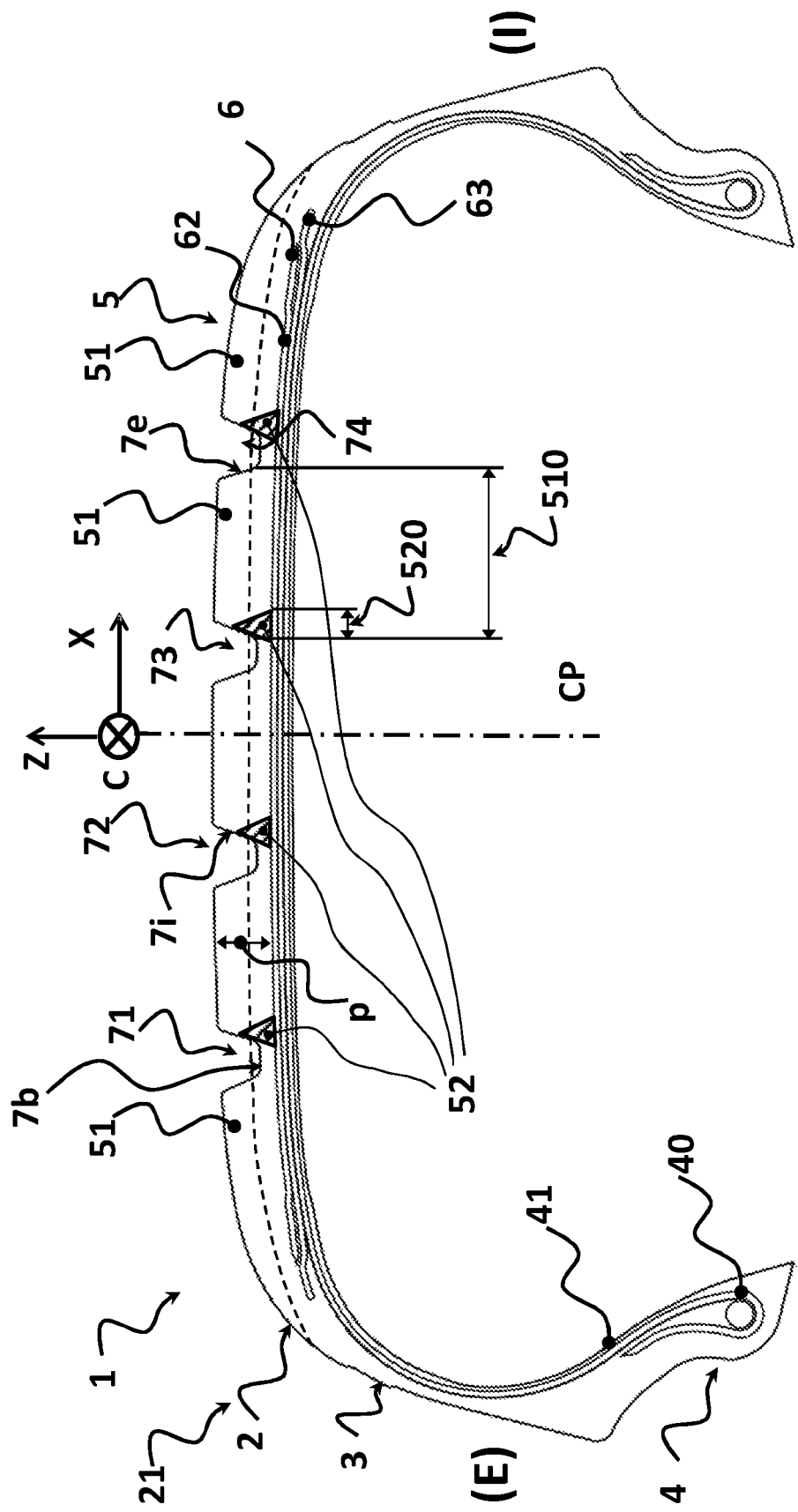

FIG. 1 shows a tyre 1 comprising a crown 2, two sidewalls 3 each connected to a bead 4. The crown 2 is connected on each side to the radially exterior end of each of the two sidewalls. The crown 2 comprises a tread 5. FIG. 1 shows an equatorial plane EP, which plane is perpendicular to the axis of rotation of the tyre, situated mid-way between the two beads 4 (mounted on rim) and passing through the middle of the belt reinforcement; FIG. 1 also indicates, by arrows placed just above the tread 5, on the equatorial plane EP, the axial X, circumferential C and radial Z directions.

Each bead has a bead wire 40. A carcass ply 41 is wrapped around each bead wire 40. The carcass ply 41 is radial and is, in a manner known per se, made up of cords; in this implementation, textile cords; these cords are arranged substantially parallel to one another and extending from one bead to the other in such a way that they form an angle of between 80° and 90° with the equatorial plane EP.

The tread 5 comprises a plurality of tread pattern blocks 51. Two axially adjacent tread pattern blocks 51 are separated by a groove 71, 72, 73, 74 extending at least partially circumferentially; each of the grooves 71, 72, 73, 74 is delimited radially towards the inside by a groove bottom, and by groove lateral walls.

The crown 2 comprises a crown reinforcement 6 comprising two crown plies 62, 63; the crown 2 also comprises a carcass ply 41. In a very conventional way, the belt plies 62, 63 are formed of metal cords arranged parallel to one another. In a way that is well known, the reinforcing elements that the cords of the carcass ply 41 and the cords of the belt plies 62, 63 form are oriented in at least three different directions so as to form a triangulation.

The crown reinforcement 6 could also comprise a hooping ply made up of hoop reinforcers formed of organic or aromatic polyamide fibres forming, with the circumferential direction, an angle at most equal to 5°. The crown reinforcement 6 could also comprise other reinforcers, oriented at an angle closer to 90°; the make up of the crown reinforcement does not form part of the invention and, in this document, when reference is made to the radially exterior surface of the belt reinforcement, that means the radially outermost level of the radially outermost layer of threads or of cords, including the fine layer of skim compound skim-coating the reinforcing threads or cords if such a layer exists.

One of the tread pattern blocks 51 also comprises a circumferential reinforcing element 52. This circumferential reinforcing element 52 is made up of a rubber compound of a stiffness at least twice as high as the stiffness of the rubber compound of the rest of the blocks of the tread; the reader may refer to the specific paragraphs hereinbelow for full information regarding the compositions of the rubber compounds.

The circumferential reinforcing element 52 extends radially from the radially exterior surface of the said crown reinforcement 6 towards the surface of the said tread with an axial width which decreases progressively with increasing radial proximity to the outside, and at most over a height "h" corresponding to 75% of the thickness "p" of the tread. The thickness "p" of the tread is measured radially between the radially exterior end of the crown reinforcement 6 and the surface of the tread 5 that is in contact with the ground.

The circumferential reinforcing element 52 has an axial width that has a maximum value 520, at the junction with the crown reinforcement 6, that is less than 30% of the axial width 510 of the said block, measured where the lateral walls of the groove meet the groove bottom. Reference may be made to FIG. 1 in particular.

The circumferential reinforcing element 52 opposes the rocking and shearing of the rib formed by the block 51 provided with such a circumferential reinforcing element 52.

For preference, all of the blocks 51 have a circumferential reinforcing element 52 as shown in FIGS. 3 to 7.

FIGS. 2, 6, 7 and 8 illustrate exemplary implementations of the invention in which the tread 2 comprises an underlayer 8. This underlayer 8 is interposed between the crown reinforcement 6 and the said blocks 51, without being interposed between the crown reinforcement 6 and the circumferential reinforcing element 52 in the examples illustrated in FIGS. 4 and 5 and, in the case of part of the axial width of the underlayer, also in FIG. 6, whereas the underlayer 85 is interposed between the crown reinforcement 6 and the said blocks 51 and also between the crown reinforcement 6 and each circumferential reinforcing element 52.5 of the said blocks 51 in the example illustrated in FIG. 8. In the case of a low-hysteresis underlayer, obviously less reinforcing material is used, this being more prone to hysteresis. In the case of a stiff underlayer, as long as the thickness of the underlayer is not too great, the reinforcement is just as effective.

Figure 9:
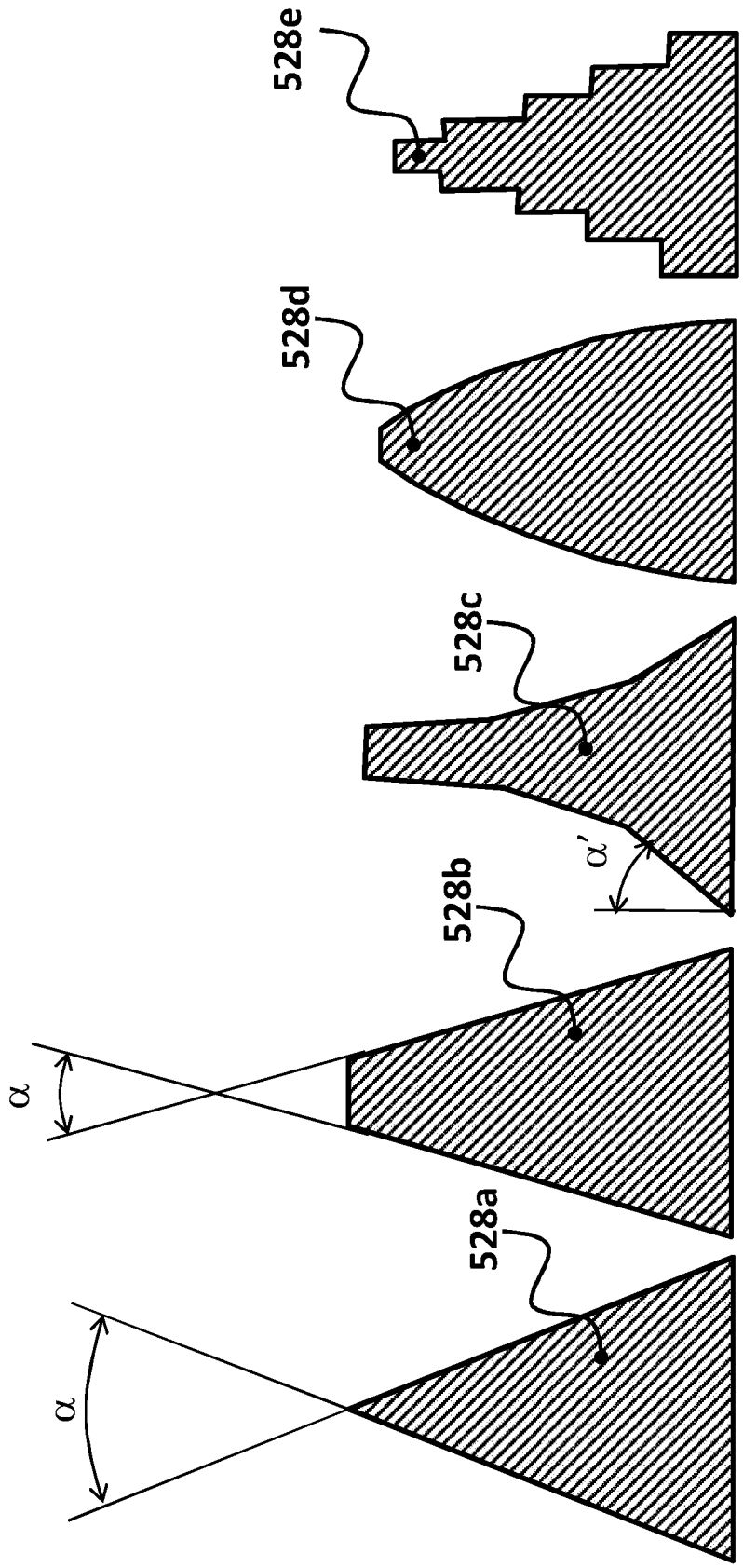
FIG. 9 depicts, in meridional section, alternative forms of embodiment of a circumferential reinforcing element according to the invention.

The shape of the circumferential reinforcing elements depicted is triangular, but this shape may vary and the lateral walls may be concave, convex or in the form of a staircase, notably without departing from the scope of this invention. The reader may make reference to FIG. 9 in which, for reference, a circumferential reinforcing element 528a viewed in meridional section has the shape of a triangle as used in all the earlier illustrations, the lateral walls, viewed in meridional section, therefore being straight lines. In the alternative form formed by the circumferential reinforcing element 528b, the meridional section thereof is a trapezium, the lateral walls viewed in meridional section also being straight lines; the radially exterior limit of this circumferential reinforcing element 528b is also a straight line and, for example, lies flush with the surface of the tread. In the alternative form formed by the circumferential reinforcing element 528c, the lateral walls viewed in meridional section are straight-line segments, the angle angle α' that each of these segments forms with the radial direction varying from one segment to the next (decreasing with increasing the radial proximity towards the outside in the figure). In the alternative form formed by the circumferential reinforcing element 528d, the lateral walls viewed in meridional section are curved, convex; they could be concave. In the alternative form formed by the circumferential reinforcing element 528e, the lateral walls viewed in meridional section form staircases. These variations in the shape of the meridional section can be used with all the alternative forms described hereinabove. The shapes of the reinforcement are, nonlimitingly, preferably symmetric in order to limit unwanted thrust when flattening, but reinforcement shapes may also be asymmetric so as to combat the said unwanted forces.

Figure 4:
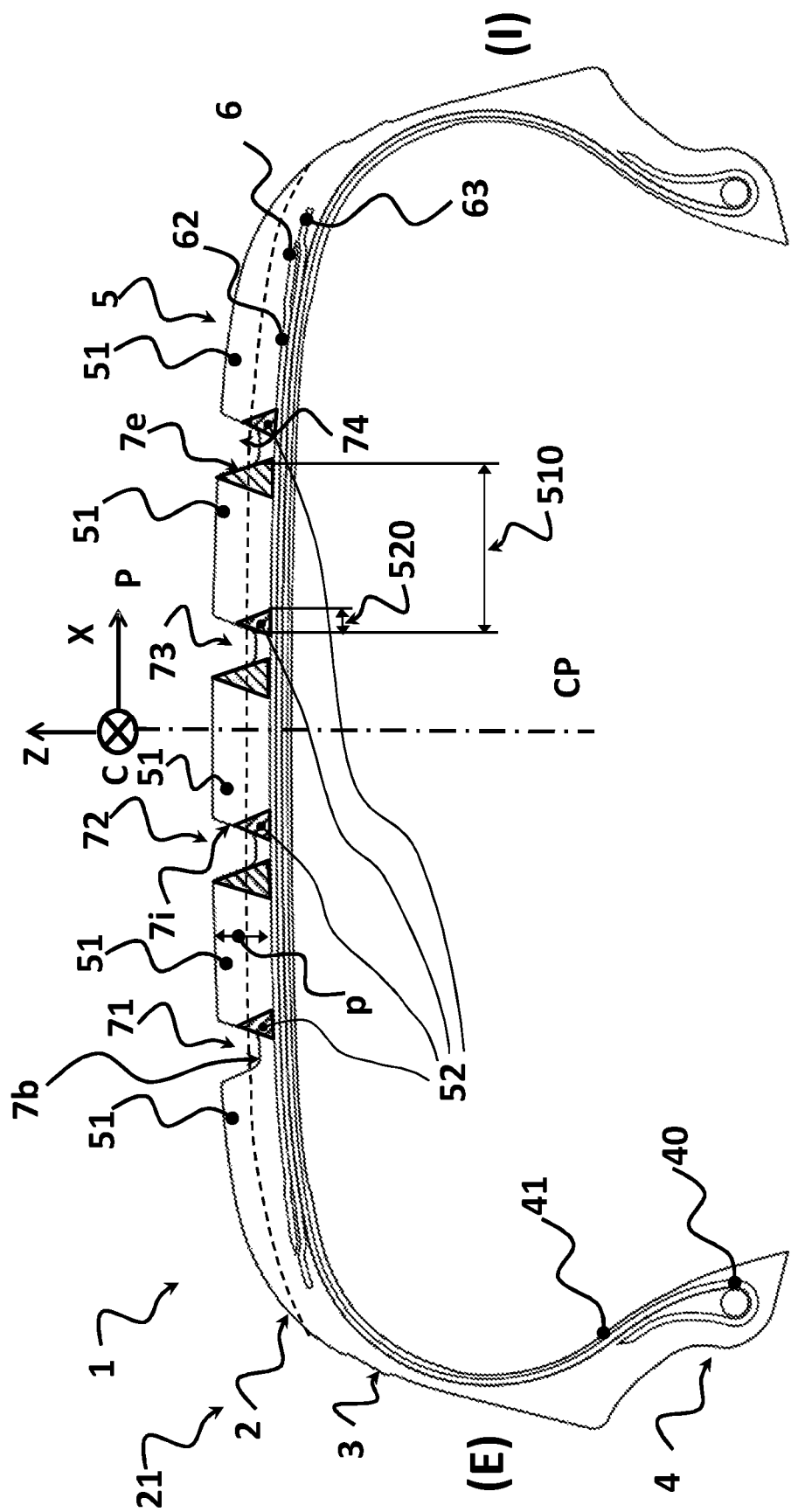
Figure 5:
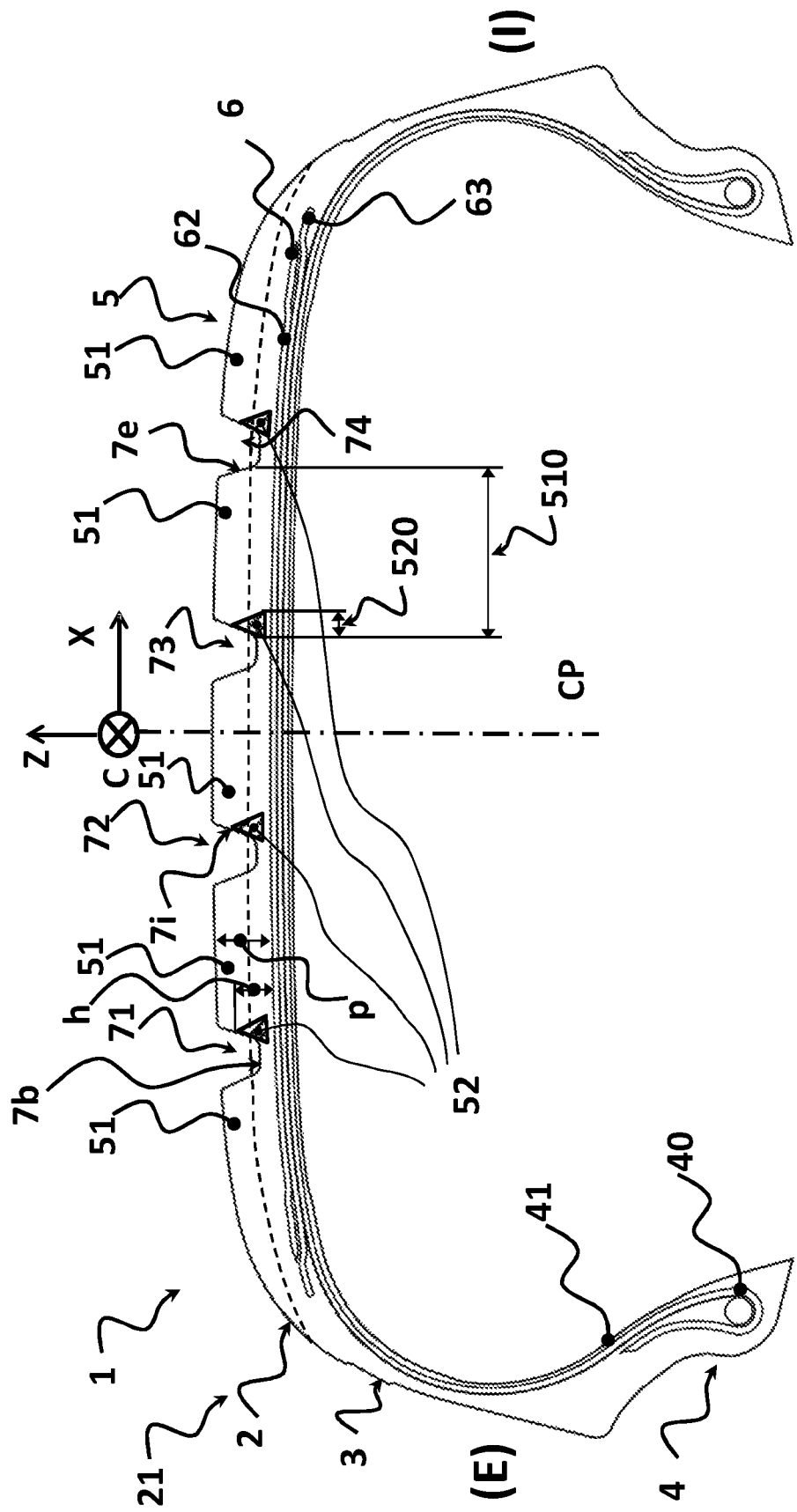
Figure 6:
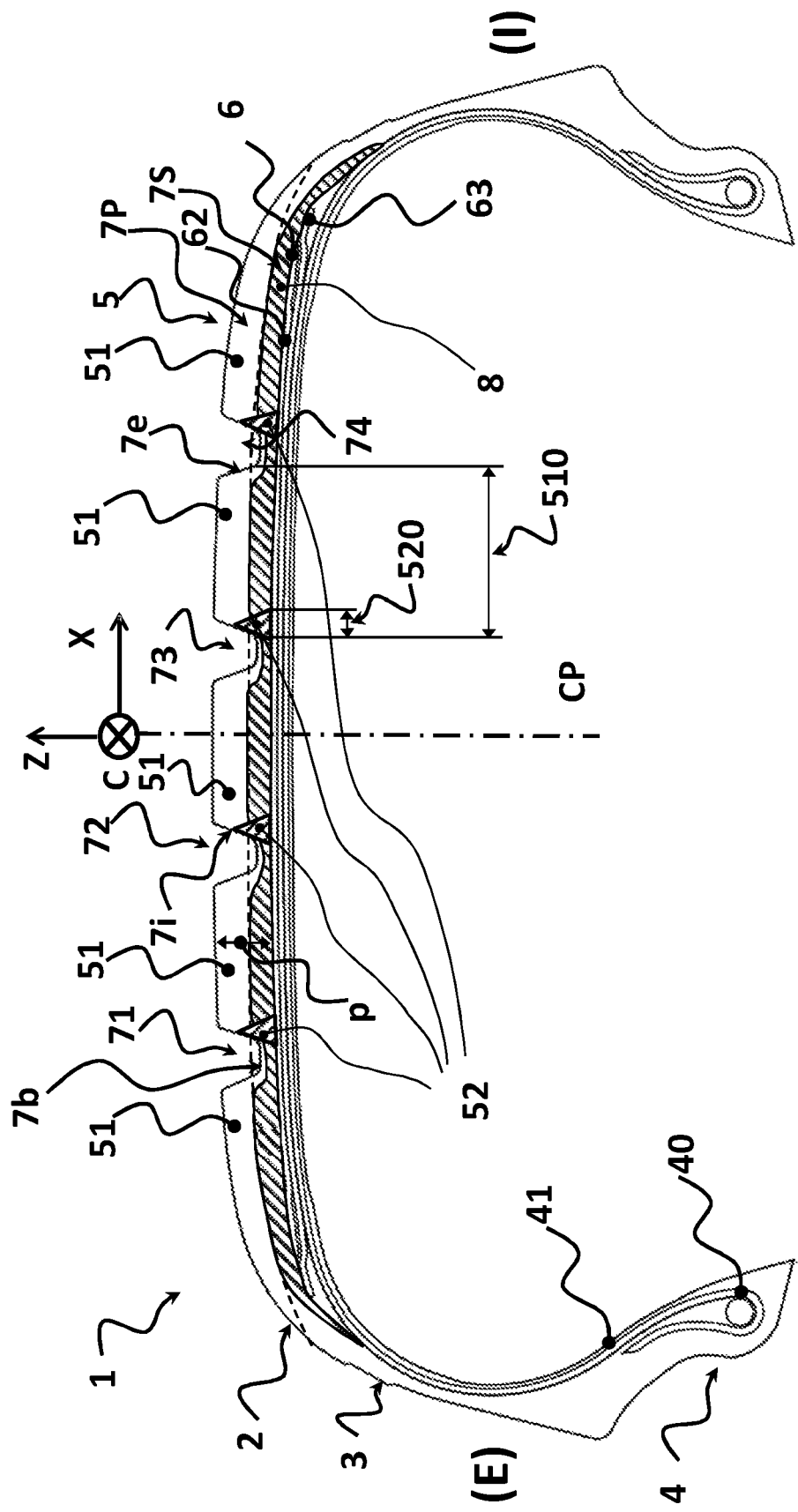
Figure 7:
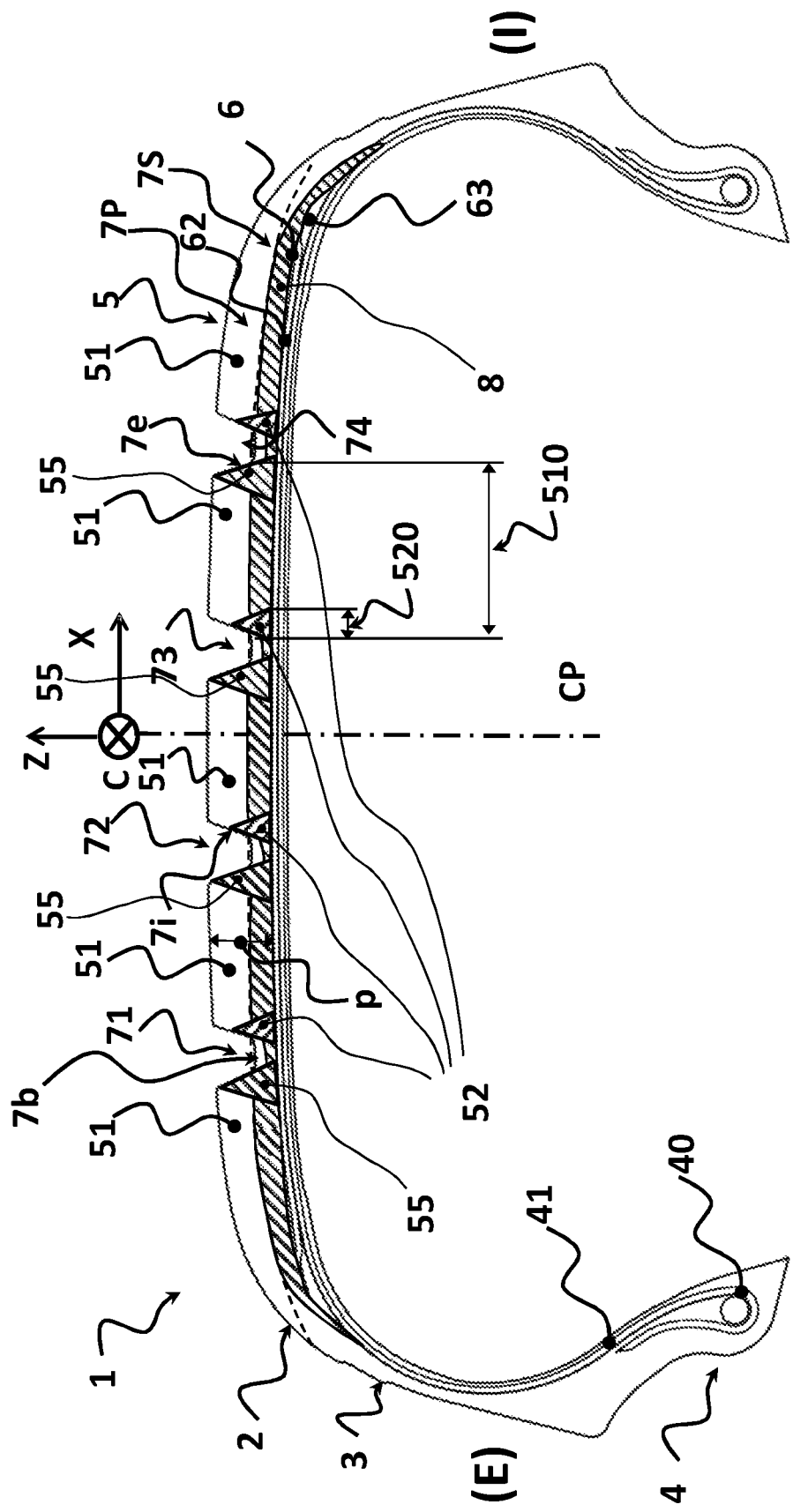
Figure 8:
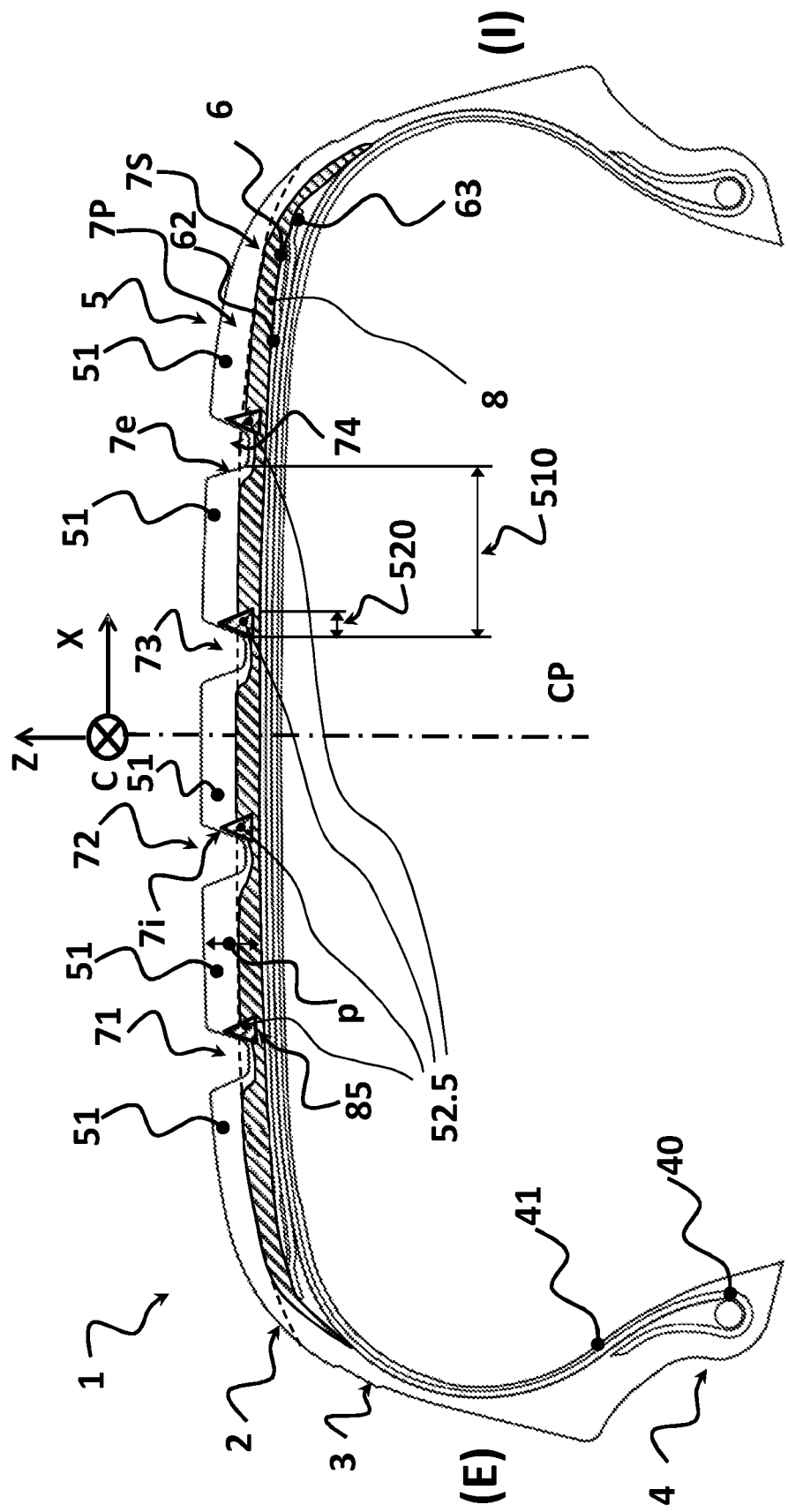

The tread pattern elements may comprise one or more reinforcing elements, for example according to the axial width of the tread pattern element, notably on large-sized tyres. FIGS. 4 and 7 show that the types of reinforcing element 52 may be associated with reinforcing elements 55 positioned on the trailing edges of the tread pattern elements 51. These elements 55 are described in patent FR3035616-A1.

Depending on the objective of the tyre designer, the compound of this underlayer may be of low hysteresis and thus improve the rolling resistance of the tyre or be stiffer than the other compound that forms the tread; in this case the underlayer has a stiffening action on the crown of the tyre. All the above-mentioned specific features of the reinforcement are compatible with the use of this underlayer. This underlayer is situated above the base of the reinforcing elements when the base exists, such that the reinforcement bears directly and primarily on the crown reinforcement. That is to say on the skim layer of the radially outermost ply of the crown architecture.

The circumferential reinforcing elements need to serve as a bearing point for opposing the shearing and rocking of the tread pattern elements which contain them. For this purpose, the compound from which these circumferential reinforcing elements are made is preferably very substantially stiffer than that of the tread. Preferably, the dynamic shear modulus G*, measured at 60° C. at 10 Hz and under an alternating shear stress of 0.7 MPa, is greater than 5 MPa; it is advantageous for this dynamic shear modulus G* to be very much higher, for example greater than 10 MPa, or than 20 MPa and very preferentially greater than 30 MPa.

Such compounds are described in particular in the Applicant Companies' application WO 2011/045342 A1.

Table 1 below gives an example of such a formulation.

TABLE 1

| Constituent | C.1 (in phr) |
| --- | --- |
| NR (1) | 100 |
| Carbon black (2) | 70 |
| Phenol-formaldehyde resin (3) | 12 |
| ZnO (4) | 3 |
| Stearic acid (5) | 2 |
| 6-PPD (6) | 2.5 |
| HMT (7) | 4 |
| Sulfur | 3 |
| CBS (8) | 2 |

(1) Natural rubber;
(2) Carbon black N326 (name according to standard ASTM D-1765);
(3) Phenol-formaldehyde novolac resin ("Peracit 4536K" from Perstorp);
(4) Zinc oxide (industrial grade - Umicore);
(5) Stearin ("Pristerene 4931" from Uniqema);
(6) N-(1,3-dimethylbutyl)-N-phenylparaphenylenediamine (Santoflex 6-PPD from Flexsys);
(7) Hexamethylenetetramine (from Degussa);
(8) N-cyclohexylbenzothiazolesulfenamide (Santocure CBS from Flexsys).

This formulation makes it possible to obtain compounds with high stiffness. The dynamic shear modulus G* measured under an alternating shear stress of 0.7 MPa at 10 Hz and 60 degrees Celsius is 30.3 MPa.

This very stiff material for the circumferential reinforcements is preferably used in treads of low stiffness with dynamic shear modulus G* values of less than 1.3 MPa and preferably less than or equal to 1.1 MPa, and more preferably still, less than or equal to 0.9 MPa.

The following Table 2 gives an example of a suitable formulation:

TABLE 2

| Composition | B1 (phr) |
| --- | --- |
| SBR (a) | 100 |
| Silica (b) | 110 |
| Coupling agent (c) | 9 |
| Liquid plasticizer (d) | 20 |
| Resin plasticizer (e) | 50 |
| Black | 5 |
| Zinc oxide | 3 |
| Stearic acid | 2 |
| Antioxidant (f) | 2 |
| Accelerator (g) | 2 |
| DPG | 2 |
| Sulfur | 1 |

The formulations are given by weight.
(a) SBR with 27% styrene, 1,2-butadiene: 5%, cis-1,4-butadiene: 15%, trans-1,4-butadiene: 80%; Tg=−48° C.
(b) "Zeosil1165MP" silica from Solvay with BET surface area of 160 m$^2$/g
(c) "SI69" TESPT silane from Evonik
(d) "Flexon 630" TDAE oil from Shell
(e) "Escorez 2173" resin from Exxon
(f) "Santoflex 6PPD" antioxidant from Solutia
(g) "Santocure CBS" accelerator from Solutia
Phr: parts by weight per 100 parts of elastomer.

The dynamic shear modulus G* after vulcanization is 0.9 MPa.

A person skilled in the art, who is a tyre designer, should be able to adapt the number and the position of the circumferential reinforcing elements in order to obtain optimum resistance to the rocking and shearing of the ribs and blocks of the tread pattern, and to do so for tyres which are asymmetrical or not.

Characterization of Materials

The rubber compounds are characterized as follows.

The dynamic mechanical properties are well known to those skilled in the art. These properties are measured on a visco-analyser (Metravib VA4000) using test specimens taken from a tyre. The test specimens used are described in the standard ASTM D 5992-96 (the version published in September 2006 but initially approved in 1996 is used) in Figure X2.1 (circular test specimens). The diameter "d" of the test specimens is 10 mm (the circular cross section is thus 78.5 mm$^2$), the thickness "L" of each portion of compound is 2 mm, giving a "d/L" ratio of 5 (as opposed to the standard ISO 2856, mentioned in paragraph X2.4 of the ASTM standard, which recommends a d/L value of 2).

The response of a test specimen of vulcanized composition subjected to a simple alternating sinusoidal shear stress at a frequency of 10 Hz is recorded. The maximum shear stress imposed is 0.7 MPa.

The measurements are made with a temperature variation of 1.5° C. per minute, from a minimum temperature lower than the glass transition temperature (Tg) of the compound or rubber to a maximum temperature greater than 100° C. Before the characterization begins, the test specimen is conditioned at the minimum temperature for 20 minutes to ensure good homogeneity of temperature in the test specimen.

The result used is notably the value of the dynamic shear modulus G* at a temperature of 60° C.

The invention claimed is:

1. A tire having an exterior side and an interior side, the tire comprising a crown reinforcement and a tread radially on the outside, the tread comprising a plurality of tread pattern blocks, two tread pattern blocks being separated by at least one groove extending at least partially circumferentially, each groove being delimited by an axially internal lateral face, by an axially external lateral face and by a groove bottom, and the tread having a contact face intended to come into contact with the roadway when the tire is being driven on and a wear limit level situated radially on the outside of a groove bottom, wherein each of the tread pattern blocks, except the axially outermost tread pattern block, comprises a circumferential reinforcing element, wherein each circumferential reinforcing element is positioned axially only on the inside relative to at least one groove when working from the outside toward the inside and axially close to the at least one groove, wherein each circumferential reinforcing element is made of a rubber compound having a dynamic shear modulus G* at least twice as high as a dynamic shear modulus G* of a rubber compound of the rest of the tread pattern blocks of the tread, wherein each circumferential reinforcing element extends radially from the radially exterior surface of the crown reinforcement toward the contact surface of the tread with an axial width which decreases progressively with increasing radial proximity to the outside, the axial width having a maximum value less than 40% of the axial width of the tread pattern block, the circumferential reinforcing element extending radially at most over a height h corresponding to 75% of a thickness p of the tread, and wherein the circumferential reinforcing element partially forms the axially internal lateral face of a tread pattern blocks.

2. The tire according to claim 1, wherein the axial width has a maximum value less than 30% of the axial width of the tread pattern block.

3. The tire according to claim 1, further comprising an underlayer interposed between the crown reinforcement and the tread pattern blocks.

4. The tire according to claim 1, wherein an angle of two lateral walls of each circumferential reinforcing element is between 35 and 45 degrees.

5. The tire according to claim 1, wherein each circumferential reinforcing element has a shape that is axially symmetrical.

6. The tire according to claim 1, wherein a rubber compound of which each circumferential reinforcing element is made has a dynamic shear modulus G*, measured at 60° C. at 10 Hz and under an alternating shear stress of 0.7 MPa, of greater than 5 MPa.

7. The tire according to claim 6, wherein the dynamic shear modulus G* of the rubber compound of which each circumferential reinforcing element is made is greater than 10 MPa.

8. The tire according to claim 1, wherein a rubber compound of the tread has a dynamic shear modulus G*, measured at 60° C. at 10 Hz and under an alternating shear stress of 0.7 MPa, of less than or equal to 1.3 MPa.

9. The tire according to claim 8, wherein the dynamic shear modulus G* of the rubber compound of the tread is less than 1.1 MPa.

* * * * *